United States Patent
Kosmicki et al.

(10) Patent No.: US 10,836,584 B2
(45) Date of Patent: Nov. 17, 2020

(54) SYSTEMS AND METHODS FOR IMPROVING THE STABILITY OF NON-FERROUS METALS ON A CONVEYOR

(71) Applicant: Novelis Inc., Atlanta, GA (US)

(72) Inventors: Michael R. Kosmicki, Spokane Valley, WA (US); Adwait A. Thakur, Spokane Valley, WA (US)

(73) Assignee: NOVELIS INC., Atlanta, GA (US)

(*) Notice: Subject to any disclaimer, the term of this patent is extended or adjusted under 35 U.S.C. 154(b) by 0 days.

(21) Appl. No.: 16/504,712

(22) Filed: Jul. 8, 2019

(65) Prior Publication Data

US 2020/0010278 A1 Jan. 9, 2020

Related U.S. Application Data

(60) Provisional application No. 62/695,254, filed on Jul. 9, 2018.

(51) Int. Cl.
*B65G 21/20* (2006.01)
*B03C 1/16* (2006.01)
(Continued)

(52) U.S. Cl.
CPC ............ *B65G 21/2009* (2013.01); *B03C 1/16* (2013.01); *B03C 1/247* (2013.01); *B65G 47/42* (2013.01);
(Continued)

(58) Field of Classification Search
CPC ............ B65G 21/2009; B65G 21/2018; B65G 47/42; B65G 47/503; B65G 2203/043;
(Continued)

(56) References Cited

U.S. PATENT DOCUMENTS 3,109,532 A 11/1963 Milan
4,830,180 A * 5/1989 Ferguson ............ B65G 21/2054
198/454
(Continued)

FOREIGN PATENT DOCUMENTS

DE 2554046 6/1977
DE 9413617 10/1994
(Continued)

OTHER PUBLICATIONS

PCT/US2019/040774, "International Search Report and Written Opinion", dated Oct. 2, 2019, 15 pages.

*Primary Examiner* — William R Harp
(74) *Attorney, Agent, or Firm* — Kilpatrick Townsend & Stockton LLP

(57) ABSTRACT

A conveying system, such as a conveying system for material including non-ferrous metals, includes a conveying belt and a stabilizer. The conveying belt includes a conveying surface and is adapted to convey the material on the conveying surface. The stabilizer is configured to apply a stabilizing force onto the material on the conveyor belt such that the material is stabilized while being conveyed. A method of stabilizing material on a conveyor belt includes receiving the material on the conveying surface of the conveyor belt, conveying the material at a conveying speed with the conveyor belt, and applying the stabilizing force onto the material with a stabilizer such that vertical displacement of at least some of the material is dampened and/or minimized at the conveying speed.

19 Claims, 13 Drawing Sheets

(51) Int. Cl.
   *B03C 1/247* (2006.01)
   *B65G 47/42* (2006.01)
   *B65G 47/50* (2006.01)

(52) U.S. Cl.
   CPC ...... *B65G 47/503* (2013.01); *B65G 2203/043* (2013.01)

(58) Field of Classification Search
   CPC ......... B03C 1/16; B03C 1/247; B03C 1/0332; B03C 1/0335
   USPC ............................................ 198/836.1, 836.2
   See application file for complete search history.

(56) References Cited

U.S. PATENT DOCUMENTS

| | | | | |
|---|---|---|---|---|
| 5,048,674 A | * | 9/1991 | Wilbur | B07C 5/02 198/534 |
| 5,080,234 A | | 1/1992 | Benson | |
| 5,297,667 A | * | 3/1994 | Hoffman | B65G 21/2054 198/493 |
| 5,931,308 A | * | 8/1999 | Gesing | B03C 1/247 209/212 |
| 8,678,194 B2 | * | 3/2014 | Rem | B03C 1/22 209/214 |
| 2011/0147279 A1 | | 6/2011 | Molteni | |
| 2017/0232446 A1 | | 8/2017 | Hillis et al. | |

FOREIGN PATENT DOCUMENTS

| | | |
|---|---|---|
| DE | 4317640 | 12/1994 |
| DE | 10008832 | 9/2001 |
| DE | 202012004227 | 8/2013 |
| EP | 2289628 | 3/2011 |
| EP | 3321217 | 5/2018 |
| WO | 2011026195 | 3/2011 |

* cited by examiner

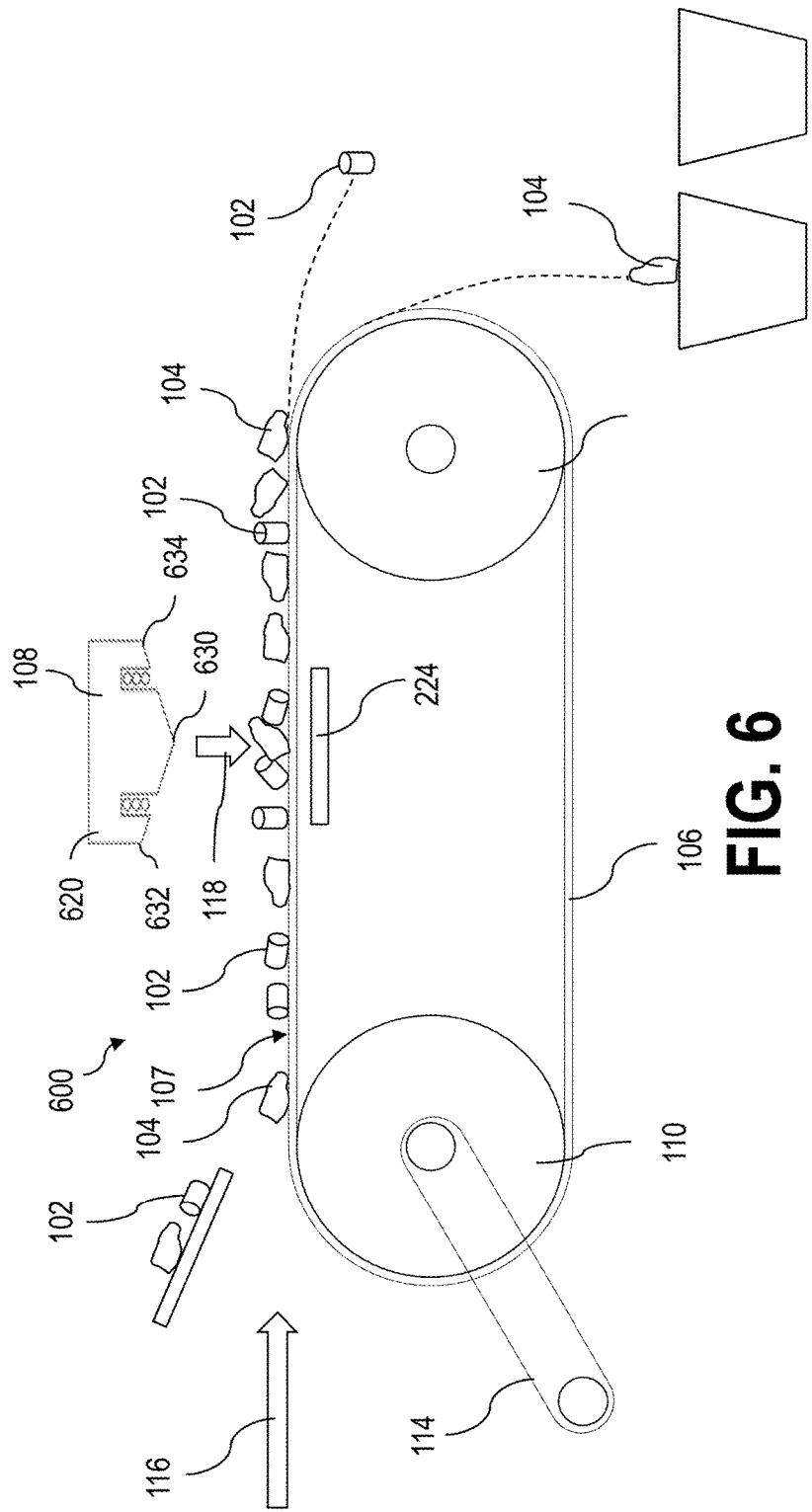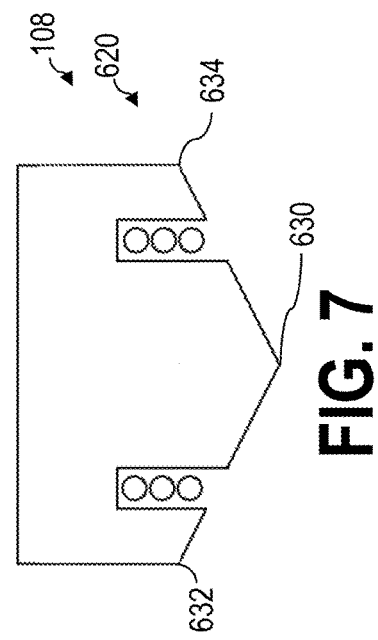

SYSTEMS AND METHODS FOR IMPROVING THE STABILITY OF NON-FERROUS METALS ON A CONVEYOR

REFERENCE TO RELATED APPLICATION

This application claims the benefit of U.S. Provisional Application No. 62/695,254, filed on Jul. 9, 2018 and titled SYSTEMS AND METHODS FOR IMPROVING THE STABILITY OF NON-FERROUS METALS ON A CONVEYOR, the content of which is hereby incorporated by reference in its entirety.

FIELD OF THE INVENTION

This application relates to conveyor belts, and more particularly to conveyor belts configured to carry mixed materials.

BACKGROUND

Conveyor belts are used in a number of industries for conveying different kinds of material. As one example, conveyor belts are used in metal recycling. During metal recycling, the conveyor belt may be used with an eddy current separator, which uses a powerful magnetic field to separate non-ferrous metals from waste after ferrous metals have previously been removed. The eddy current separator is commonly provided as an end roller of the conveyor, and the conveyor belt conveys mixed waste such that at the end of the conveyor belt, non-ferrous metals are thrown forward from the belt while non-metals fall off the belt due to gravity. Traditionally, conveyor belts with eddy current separators are run at low speeds (e.g., about 1-3 m/s) such that the material on the belt is stable. To achieve higher throughputs in production environments, the belt speed must be high (e.g., up to about 10-20 m/s). However, at such higher speeds, the material on the belt is not stable and bounces or moves around on the belt. Such movement decreases the separation effectiveness of the eddy current separator because the pieces may bounce out of range of the magnetic field created by the eddy current separator and/or the material may become stacked up (i.e., the material is not a monolayer), which is more difficult to separate.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to various examples, a conveying system includes a conveyor belt and a stabilizer. The conveyor belt includes a conveying surface and is adapted to convey material on the conveying surface. The stabilizer is configured to apply a stabilizing force onto the material on the conveyor belt.

In some examples, the conveying system includes a first roller and a second roller downstream from the first roller. In certain aspects, the conveyor belt is movably supported on the first roller and the second roller, and the second roller is at an end of the conveying system. In various cases, the second roller includes an eddy current separator roller configured to apply a magnetic field onto the material on the conveyor belt. In some cases, the stabilizer is provided adjacent to the second roller such that the stabilizing force is applied onto the material at the second roller. According to certain examples, the stabilizer is provided upstream from the second roller such that the stabilizing force is applied onto the material upstream from the second roller. In various examples, the first roller and the second roller are configured to move the conveyor belt at a conveying speed of from about 10 m/s to about 20 m/s, and the stabilizer is configured to apply the stabilizing force onto the material on the conveyor belt such that the material is stabilized at the conveying speed.

In certain cases, the stabilizer is configured to apply the stabilizing force onto non-ferrous metals of the material. In some aspects, the stabilizer includes at least one magnet above the conveying surface, and the at least one magnet is configured to apply a downward magnetic field as the stabilizing force onto the material. In various examples, the at least one magnet is a permanent magnet.

In certain aspects, the at least one magnet is an electromagnet. In some aspects, the electromagnet is an AC electromagnet. In various cases, the electromagnet is adjustable such that the downward magnetic field is adjustable. According to various examples, at least one of a strength of the magnetic field, a frequency of the magnetic field, or an angle of a central axis of the electromagnet with respect to the conveying surface are adjustable. In some cases, the at least one magnet includes a plurality of magnets. In various cases, the stabilizer further includes a first region with a first subset of the plurality of magnets and a second region with a second subset of the plurality of magnets, and the magnetic field generated by at least one of the magnets of the first subset is different from the magnetic field generated by at least one of the magnets of the second subset. According to some examples, the stabilizer includes a triggering region and a stabilizing region, and the at least one magnet is in the stabilizing region. In various cases, each magnet is independently controllable.

In some aspects, the conveying system includes a sensor upstream from the stabilizer and a controller. In various cases, the sensor is configured to detect a position of at least one non-ferrous piece of metal of the material on the conveying surface, and the controller is configured to activate at least one of the plurality of magnets corresponding to the position on the conveying surface.

According to various aspects, the stabilizer is configured to apply the stabilizing force in a stabilizing region, the stabilizing force comprises an upstream stabilizing force at an upstream portion of the stabilizing region and a downstream stabilizing force at a downstream portion of the stabilizing region, and the downstream stabilizing force is different from the upstream stabilizing force. In certain cases, the downstream stabilizing force is greater than the upstream stabilizing force.

In various examples, the conveying system includes a magnetic flux director below the conveying surface such that the conveying belt passes between the at least one magnet and the flux director. In some examples, the conveying system includes a controller configured to control the stabilizer based on a conveying speed of the conveyor belt. In various aspects, the conveying system includes a sensor configured to detect a position of at least one non-ferrous piece of metal of the material on the conveying surface, and the controller is configured to control the stabilizer based on the position on the conveying surface.

In certain examples, the stabilizer comprises at least one air flow generator configured to provide air flow at a predetermined rate onto the conveying surface at a predetermined air flow level.

In some cases, the stabilizer includes at least one electromagnet below the conveying surface of the conveyor belt and a copper plate between the conveyor belt and the at least one electromagnet. In certain aspects, the at least one electromagnet is configured to apply a primary magnetic field on the copper plate such that an attraction force is created between a top of the copper plate and a non-ferrous piece of the material.

In various examples, the stabilizer is configured to apply a stabilizing force onto a non-ferrous metal of the material on the conveyor belt, and the non-ferrous metal is stabilized such that a position of the non-ferrous metal relative to the conveying surface is maintained while being conveyed.

According to certain examples, a method of stabilizing material on a conveyor belt includes receiving the material on a conveying surface of the conveyor belt, conveying the material at a conveying speed with the conveyor belt, and applying a stabilizing force onto the material with a stabilizer such that vertical displacement (e.g., bouncing) of at least some of the material is dampened and/or minimized. In certain cases, a position of at least some of the material relative to the conveying surface is maintained at the conveying speed.

In some examples, the conveying speed is from about 1 m/s to about 20 m/s. In certain cases, the conveying speed is from about 10 m/s to about 20 m/s. In various examples, at least some of the material includes non-ferrous metal, and the stabilizing force is applied on the non-ferrous metal.

In some aspects, the stabilizer includes at least one magnet, and the stabilizing force includes a magnetic field. According to various aspects, the at least one magnet includes an electromagnet. In various examples, the method includes controlling the magnetic field by controlling at least one of a strength of the magnetic field, a frequency of the magnetic field, or a direction of the magnetic field.

In certain examples, the method includes detecting a position of a non-ferrous metal of the material on the conveying surface before applying the stabilizing force. In some cases, applying the stabilizing force includes applying the stabilizing force at the position on the conveying surface. In various aspects, the stabilizer includes a plurality of magnets, a first subset of the magnets are arranged in a first region and a second subset of the magnets are arranged in a second region, applying the stabilizing force comprises applying a first magnetic field by the first subset of magnets and applying a second magnetic field by the second subset of magnets, and the second magnetic field is different from the first magnetic field.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 6 is a side view of another conveying system according to aspects of the current disclosure.

FIG. 7 is a schematic of a stabilizer of the conveying system of FIG. 6.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

Figure 1:
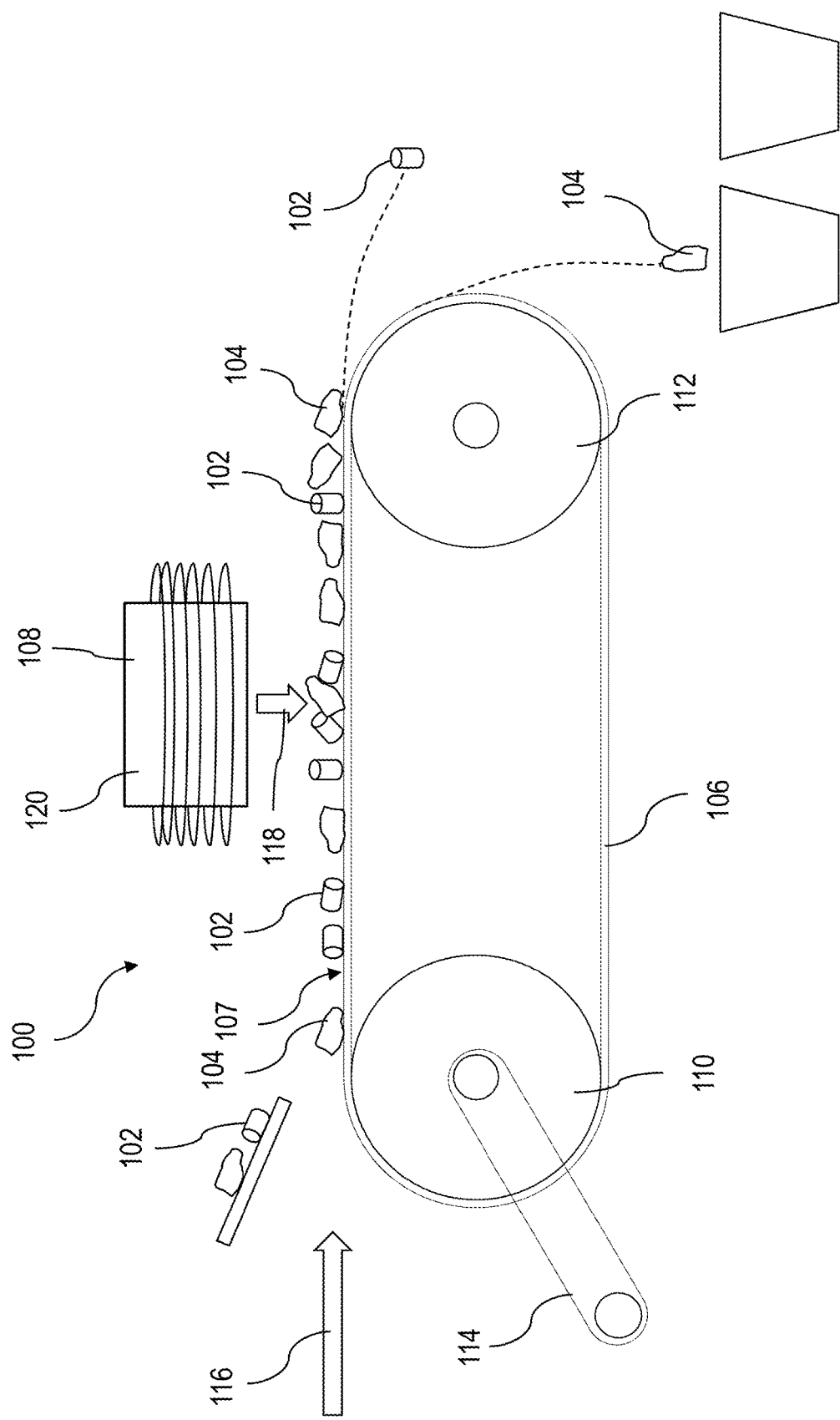
FIG. 1 is a side view of a conveying system according to aspects of the current disclosure.

FIG. 1 illustrates an exemplary conveyor system 100 for conveying material, including but not limited to, mixed material that contains metal materials 102 and non-metal materials 104. In the present example, the conveyor system 100 is a separator system for metal recycling such that the metal materials 102 can be separated from the non-metal materials 104. However, it will be appreciated that the conveyor system 100 may be used in various other settings or environments as desired.

As illustrated in FIG. 1, the conveyor system 100 includes a conveyor belt 106 and a stabilizer 108. The conveyor belt 106 has a conveying surface 107 and is movably supported on a first roller 110 and a second roller 112. In various examples, the first roller 110 is driven by a drive system 114 such that the conveyor belt 106 moves in the direction indicated by arrow 116. The second roller 112 is an end roller or idler roller downstream from the first roller 110. In other examples, the second roller 112 may be driven by the drive system 114 to move the conveyor belt 106. In various examples, the second roller 112 is an eddy current separator ("ECS") roller that separates the metal materials 128 from the non-metal materials 104. In various aspects, the second roller 112 may have an outer shell that acts as an idler pulley, and the magnetic rotor rotates on a separate pair of bearings and is driven at a much higher RPM in order to generate the magnetic field required to induce eddy currents. In such examples, the second roller 112 applies a magnetic field onto the materials on the conveyor belt 106 that causes the metal materials 102 to be thrown forward from the conveyor belt 106 while the non-metal materials 104 fall off the conveyor belt 106 due to gravity. In certain examples, the second roller 112 is downstream from the first roller 110. Although not illustrated, any number of intermediate roller may be provided between the first roller 110 and the second roller 112 and/or upstream from the first roller 110 depending on a desired length of the conveyor system 100. As one non-limiting example, the conveyor system 100 may have three rollers. Moreover, it will be appreciated that the rollers need not be linearly aligned. For example in some cases, the system may include two rollers that are vertically aligned (e.g., another roller is vertically aligned with the second roller 112).

In various examples, the conveyor belt 106 is moved on the rollers 110, 112 at a conveying speed. In some examples, the conveying speed (i.e., the speed of the belt 106) is a low conveying speed. In such examples, the low conveying speed is from about 1 m/s to about 3 m/s, such as about 1 m/s, about 2 m/s, and or about 3 m/s. At low conveying speeds, the material on the conveyor belt 106 is relatively stable, meaning that the position of each piece of material relative to the conveyor belt 106 is generally maintained, and the material does not move relative to the conveyor belt 106 as it is conveyed. In other words, vertical displacement of at least some of the material is dampened and/or minimized.

In other examples, such as to achieve higher throughputs in production environments, the conveying speed is a high conveying speed. In certain cases, the high conveying speed is from about 3 m/s to about 20 m/s, such as about 3 m/s, about 4 m/s, about 5 m/s, about 6 m/s, about 7 m/s, about 8 m/s, about 9 m/s, about 10 m/s, about 11 m/s, about 12 m/s, about 13 m/s, about 14 m/s, about 15 m/s, about 16 m/s, about 17 m/s, about 18 m/s, about 19 m/s, and/or about 20 m/s. In other examples, the high conveying speed may be greater than 20 m/s. At high conveying speeds, the material on the conveyor belt 106 is not stable and may bounce or otherwise move around on the conveyor belt 106 as the material is conveyed. When the conveyor system 100 is a component of a separator system and includes the ECS roller 112, such bouncing and movement reduces the separation effectiveness of the system. For example, at high conveying speeds, the metal materials 102 such as non-ferrous metals may bounce or move out of range of the magnetic field created by the ECS roller 112 such that they are not separated from the non-metal material 104. Additionally or alternatively, at high conveying speeds, the material may stack on top of itself such that it is not presented as a monolayer to the ECS roller 112, which reduces the effectiveness of the magnetic field to separate the metal material 102 from the non-metal material 104.

The stabilizer 108 of the conveyor system 100 is configured to apply a stabilizing force (represented by arrow 118 in FIG. 1) onto the material on the conveyor belt 106 such that at least some of the material is stabilized on the conveyor belt 106 at high conveying speeds. In some optional examples, the stabilizer 108 may also apply the stabilizing force 118 onto the material at low conveying speeds, although it need not in other examples. As discussed in detail below, in some cases, the stabilizer 108 includes one or more magnets above the conveying surface 107, and the stabilizing force 118 is a magnetic field. In other examples, the stabilizer 108 includes one or more magnets with a copper plate below the conveying surface 107, and the stabilizing force 118 is a magnetic field. In other optional examples, the stabilizer 108 is at least one air flow generator configured to provide air flow at various predetermined rates, and the stabilizing force 118 is air flow. Various combinations of types of stabilizers may also be utilized. As one non-limiting example, the stabilizer may include both a magnet and an airflow generator. Various other suitable stabilizers and stabilizing forces may be utilized.

Figure 10:
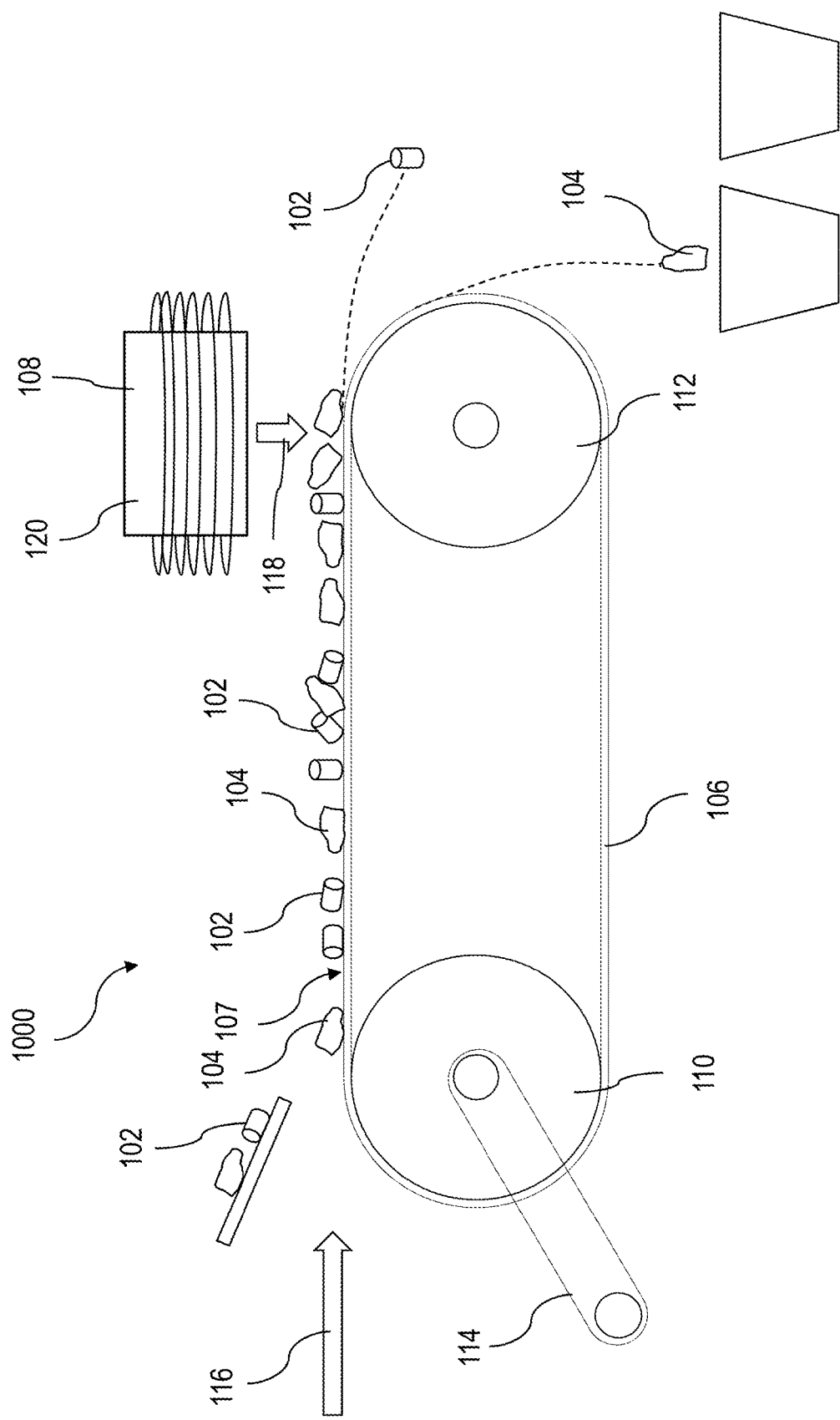
FIG. 10 is a side view of another conveying system according to aspects of the current disclosure.

As illustrated in FIG. 1, in some examples when the conveying system 100 is the separator system, the stabilizer 108 is upstream from the ECS roller 112 such that the stabilizing force 118 is applied onto the material on the conveyor belt 106 before the magnetic field from the ECS roller 112 is applied onto the material. In such examples, the metal material 102 may be stabilized on the conveyor belt 106 by the stabilizer 108 such that the metal material 102 can be effectively separated from the non-metal materials by the ECS roller 112. In other examples, as illustrated in FIG. 10, the stabilizer 108 may be substantially aligned with and/or adjacent to the ECS roller 112. In such examples, the stabilizing force 118 may stabilize the material (e.g., metal material 102) on the conveyor belt 106 while the ECS roller 112 applies the magnetic field to sort the material. In other examples, the stabilizer 108 may be provided at various other locations relative to the ECS roller 112 and/or conveyor belt 106 as desired. In some examples, the conveying system 100 includes more than one stabilizer 108.

Referring to FIG. 1, in some examples, the stabilizer 108 is an electromagnet 120. Electromagnets are temporary magnets, meaning that they only retain their magnetism when an electrical current is running through them. In certain cases, the electromagnet is an AC electromagnet. While an electromagnet 120 is illustrated, in other examples, other types of permanent magnets or temporary magnets, such as rotating or moving permanent magnets, may be used to provide a mobile magnetic field (see, e.g., FIGS. 4 and 5). In some examples, the electromagnet 120 is an electromagnetic coil. While one electromagnet 120 is illustrated in FIG. 1, the number of electromagnets (or other types of magnets or combination of magnets) should not be considered limiting on the current disclosure. For example, as described in detail below with reference to FIGS. 2 and 3, the stabilizer 108 may include a plurality of electromagnets, permanent magnets, or various combinations thereof. In some examples, the electromagnet 120 is above the conveying surface 107, and a magnetic force of the electromagnet is the stabilizing force 118.

The electromagnet 120 is connected to a power source that supplies an electric current to the electromagnet 120. While the electric current is supplied to the electromagnet 120, the electromagnet 120 creates the magnetic field as the stabilizing force 118. When the conveyor system 100 is the separator system, the stabilizing force 118 from the electromagnet 120 may stabilize the metal materials 102 on the conveying surface 107. When the electric current to the electromagnet is stopped, the stabilizing force 118 disappears. By using the electromagnet 120 as the stabilizer 108, the stabilizing force 118 can be quickly changed or adjusted to change or adjust the stability of the metal materials 102 on the conveyor belt 106. Exemplary techniques for adjusting the stabilizing force 118 are described below and may be used individually or in any combination as desired. Such techniques may be performed by a controller 222 (see FIG. 2) or manually by an operator.

In some examples, the magnetic field from the electromagnet 120 (and thus the stabilizing force 118) is controlled by controlling flux provided to the electromagnet 120. Controlling the amount of current includes, but is not limited to, controlling or adjusting a design of coils of the electromagnet 120, increasing or decreasing a frequency of the flux, increasing the flux provided to the electromagnet 120 to increase the stabilizing force 118, and/or decreasing the flux provided to the electromagnet 120 to decrease the stabilizing force.

In some examples, adjusting the stabilizing force 118 includes controlling a current supply time, which is the duration of time in which the current is supplied from the power source to the electromagnet 120. Because the stabilizing force 118 is only present while the current is provided to the electromagnet 120, adjusting the current supply time adjusts the amount of time that the stabilizing force 118 is applied to the metal materials 102. In some examples, controlling the current supply time includes decreasing the current supply time to decrease the amount of time that the stabilizing force 118 is applied to the metal materials 102. In other examples, controlling the current supply time includes increasing the current supply time to increase the amount of time that stabilizing force 118 is applied to the metal materials 102.

In certain examples, adjusting the stabilizing force 118 includes pulsing the current provided to the electromagnet 120. Pulsing the current may include alternating the amount of current provided in a regular or irregular pattern, alternating periods in which the current is activated or "on" and deactivated or "off" in a regular or irregular pattern, or other desired regular or irregular patterns where at least one aspect of the current is adjusted. In various examples, pulsing the current may provide various patterns of the stabilizing force 118 onto the metal materials 102. In some examples, adjusting the stabilizing force 118 includes oscillation of the stabilizing force 118. In various cases, adjusting the stabilizing force 118 includes reversing the magnetic field. In some aspects, reversing the magnetic field includes changing the direction of flow of the electric current. In other examples, adjusting the stabilizing force 118 includes controlling a vertical distance between the electromagnet 120 and the conveyor belt 106. In certain examples, adjusting the stabilizing force 118 includes controlling an angular orientation of the electromagnet 120 (and thus an angle of the magnetic field) relative to the conveying surface 107. In various examples, adjusting the stabilizing force 118 includes controlling a shape or angle of the electromagnet 120.

Figure 2:
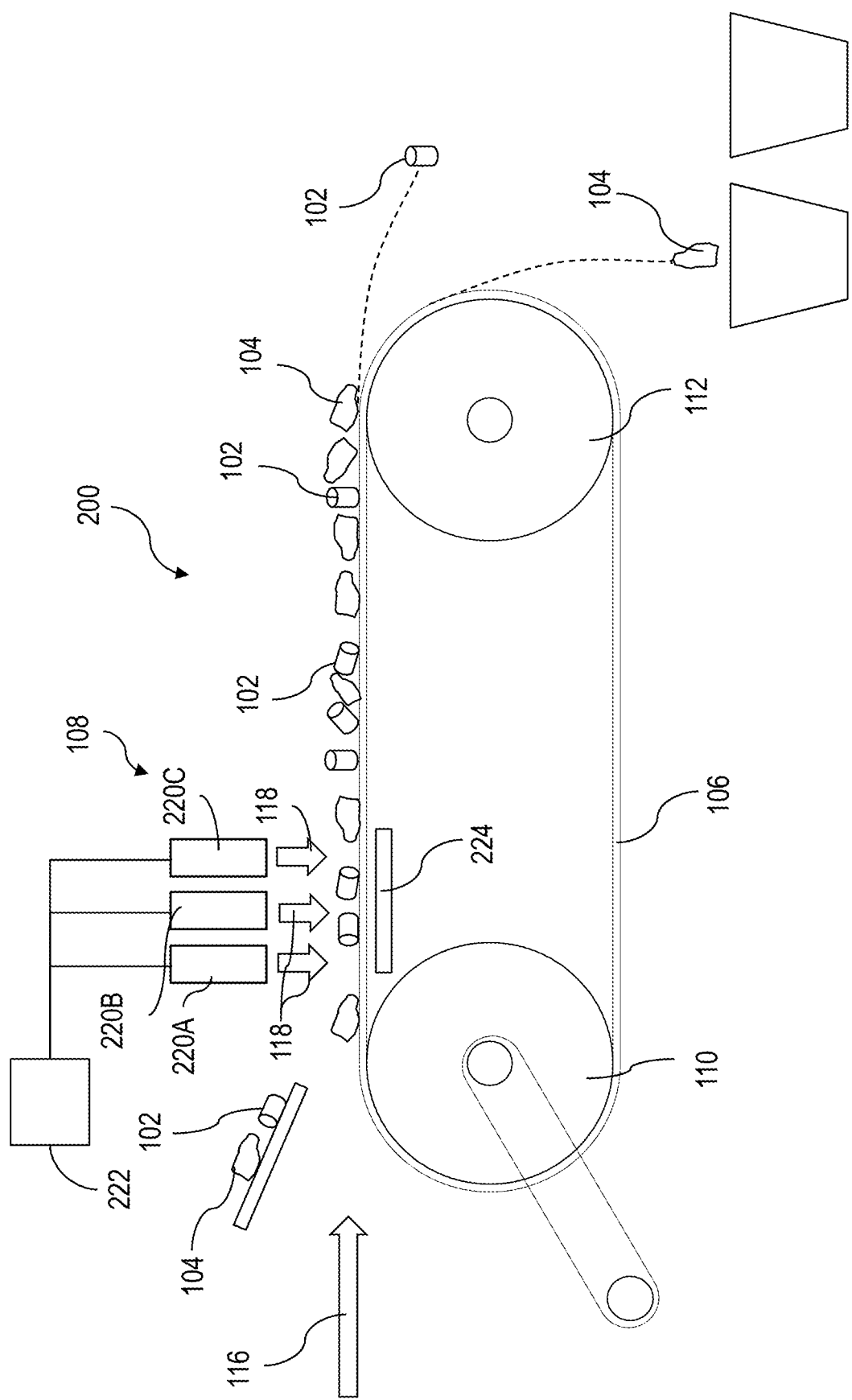
FIG. 2 is a side view of another conveying system according to aspects of the current disclosure.
Figure 3:
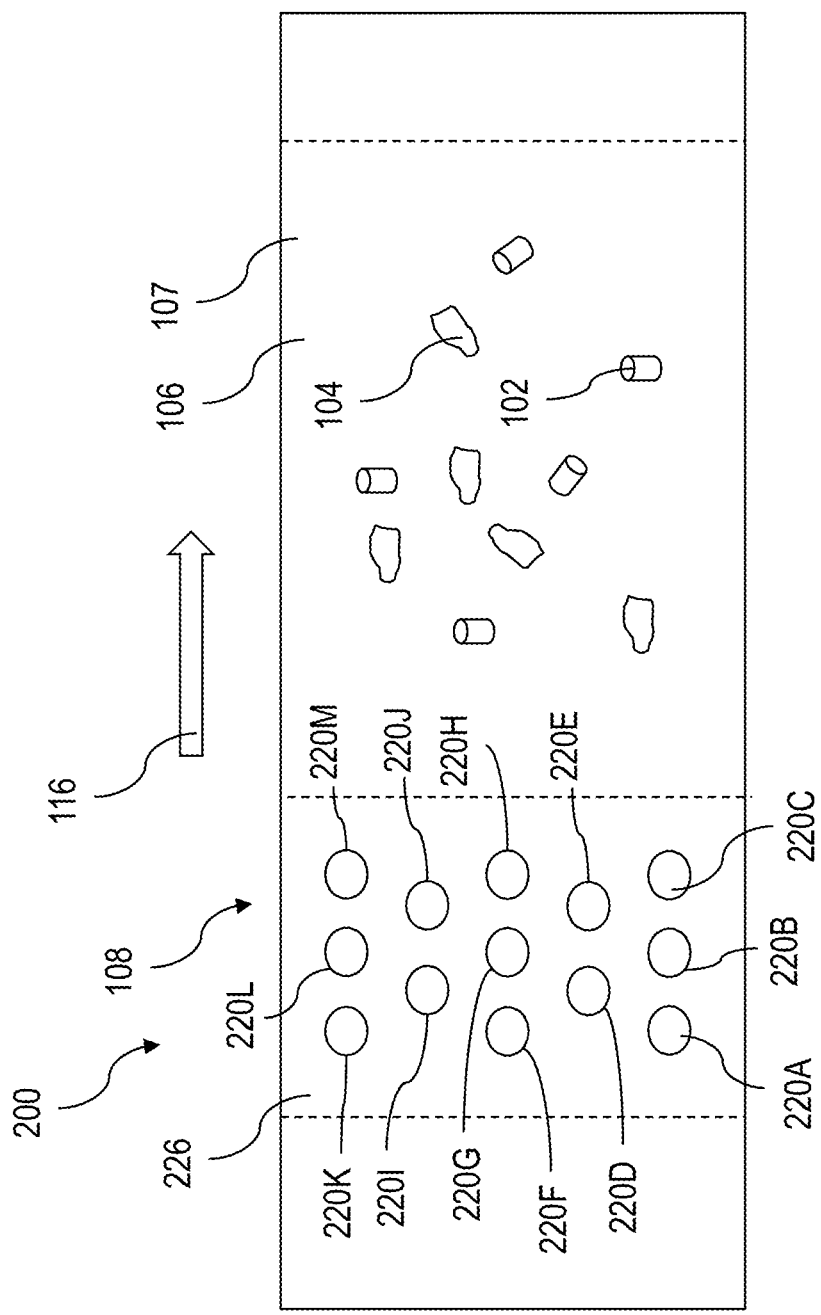
FIG. 3 is top view of the conveying system of FIG. 2.

FIGS. 2 and 3 illustrate another example of a conveying system 200. The conveying system 200 is substantially similar to the conveying system 100 except that the stabilizer 108 includes a plurality of electromagnets 220A-M, and each electromagnet 220A-M is configured to apply a stabilizing force 118. The stabilizer 108 with the plurality of electromagnets 220 (or any other type of stabilizer) is arranged in a stabilizing region 226 (see FIG. 3), which is a region in which the stabilizing force 118 is applied onto the material on the conveyor belt 106. In some examples, the stabilizing region 226 extends along a portion of the conveyor belt 106, and in other examples, the stabilizing region 226 extends along the entire length of the conveyor belt 106 conveying the material.

Each electromagnet 220A-M may be substantially similar to the electromagnet 120. The number and/or arrangement of the electromagnets should not be considered limiting on the current disclosure. As illustrated in FIG. 2, in various examples, each electromagnet is communicatively connected to a controller 222. In certain cases, the controller 222 independently controls each electromagnet 220, although it need not in other examples. In certain examples, the controller 222 may control each electromagnet 220 based on the conveying speed of the conveyor belt 106, a position or location of metal materials 102 (or other targeted materials) on the conveying surface 107, or various other factors.

In some aspects, the stabilizer 108 is controlled such that the stabilizing force 118 from one electromagnet (e.g., electromagnet 220A) is different from the stabilizing force 118 of another electromagnet (e.g., electromagnet 220B). As one non-limiting example, the electromagnets 220 are controlled such that the strength of the stabilizing force 118 from an upstream electromagnet is less than the strength of the stabilizing force 118 from a downstream electromagnet. In other words, in some non-limiting examples, the strength of the stabilizing force 118 on the metal materials 102 is ramped up in a downstream direction. In such examples, the ramped stabilizing force 118 may allow for the metal material 102 to get under the stabilizer 108 and provide a more controlled stabilizing of the metal material 102 through the stabilizing force 118. In various examples, the stabilizer 108 includes a first region along the conveyor belt 106 that includes a first subset of the plurality of electromagnets and a second region along the conveyor belt 106 that includes a second subset of the plurality of electromagnets. In some optional examples, the stabilizing force 118 from at least one of the electromagnets in the first region is different from the stabilizing force 118 from at least one of the electromagnets in the second region. In other examples, various patterns of stabilizing forces 118 may be applied onto the metal materials 102 by controlling the electromagnets 220.

As illustrated in FIG. 2, in some optional examples, a flux director 224 may be included to increase the effectiveness of the stabilizing force 118 on the metal material 102. The flux director 224 may be various suitable materials, including, but not limited to, a laminated steel plate.

Figure 4:
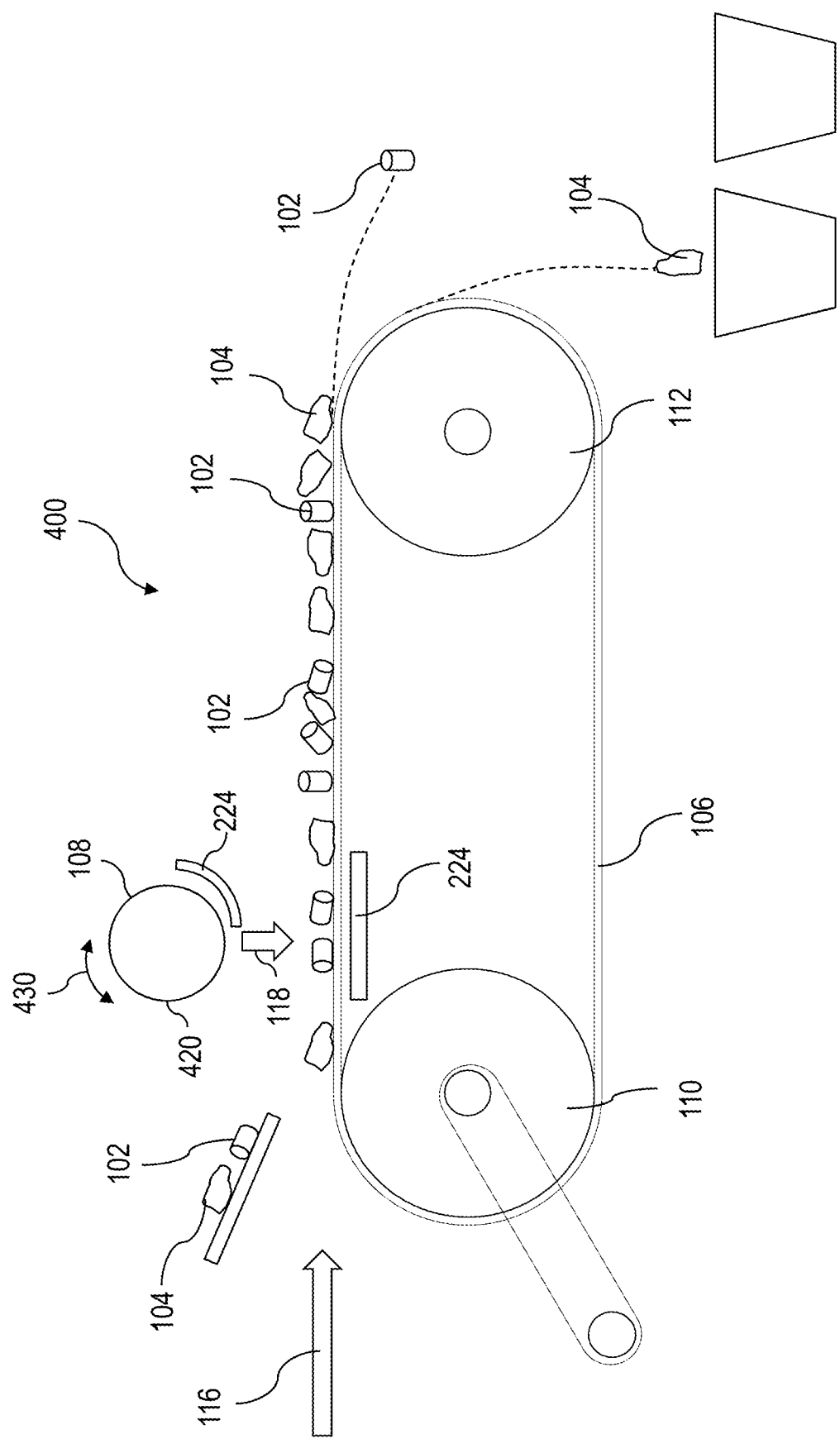
FIG. 4 is a side view of another conveying system according to aspects of the current disclosure.
Figure 5:
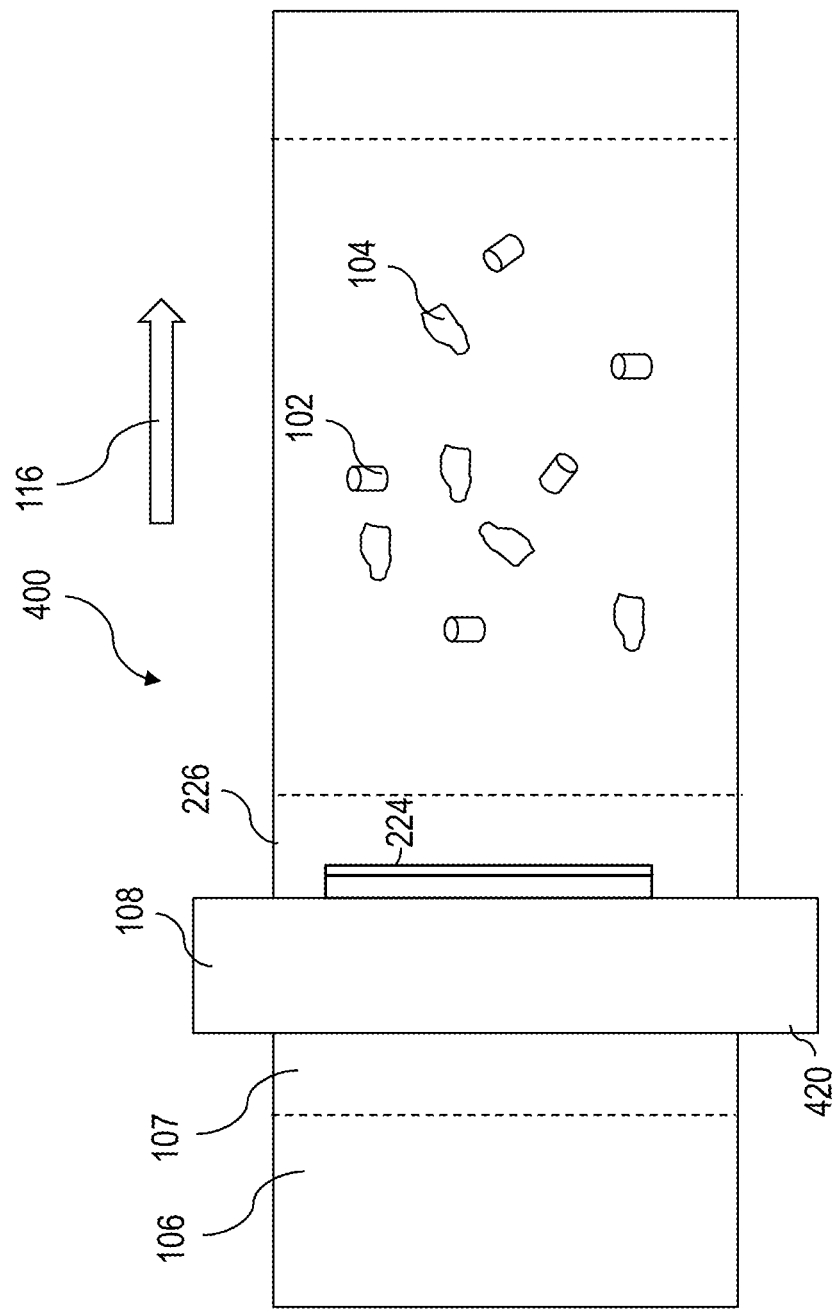
FIG. 5 is a top view of the conveying system of FIG. 4.

FIGS. 4 and 5 illustrate another example of a conveying system 400. The conveying system 400 is substantially similar to the conveying systems 100 and 200 except that the stabilizer 108 of the conveying system 400 is a rotating magnet 420, which may be a permanent magnet. Although one rotating magnet 420 is illustrated, any number of rotating magnets 420 may be utilized. The rotating magnet 420 imparts a magnetic field as the stabilizing force 118 on the material on the conveyor belt by rotating in a forward direction or a reverse direction (indicated by arrow 430 in FIG. 4). The rotating magnet 420 is selectively rotatable in the forward direction or the reverse direction to control the stabilizing force 118. The stabilizing force 118 may also be controlled by vertically adjusting the rotating magnet 420 relative to the conveyor belt 106 such that a distance between the rotating magnet 420 and the conveyor belt 106 is adjusted. In some examples, the stabilizing force 118 may be controlled by controlling a rotational speed of the rotating magnet 420. The conveying system 400 also includes two flux directors 224. One flux director 224 is optionally provided below the belt and another flux director 224 is adjacent to and downstream from the stabilizer 108 such that a horizontal force is not applied to the material and the flux has a path back to the rotor. The number and/or location of the flux directors 224 should not be considered limiting on the current disclosure.

FIGS. 6 and 7 illustrate another example of a conveying system 600. The conveying system 600 is substantially similar to the conveying systems 100, 200, and 400 except that the stabilizer 108 includes an electromagnet 620 (with coils illustrated) having an angled shape with an apex 630. In various examples, a strength of the magnetic field at the apex 630 is greater than a strength of the magnetic field at other portions of the electromagnet 620. In such examples, the electromagnet 620 provides a stabilizing force 118 that is ramped up from an upstream end 632 to the apex 630 and that is ramped down from the apex 630 to a downstream end 634. In some examples, such a ramped profile may allow for the stabilizer 108 to gradually stabilize the metal material 102 on the conveyor 106 (during the ramped up portion) and then gradually decrease the stabilizing force 118 to let the material continue on the conveyor belt 106. In some aspects, such a ramped profile may provide improved stabilizing with the stabilizer 108. In other examples, various other profiles or patterns for the stabilizing force 118 may be utilized.

Figure 8:
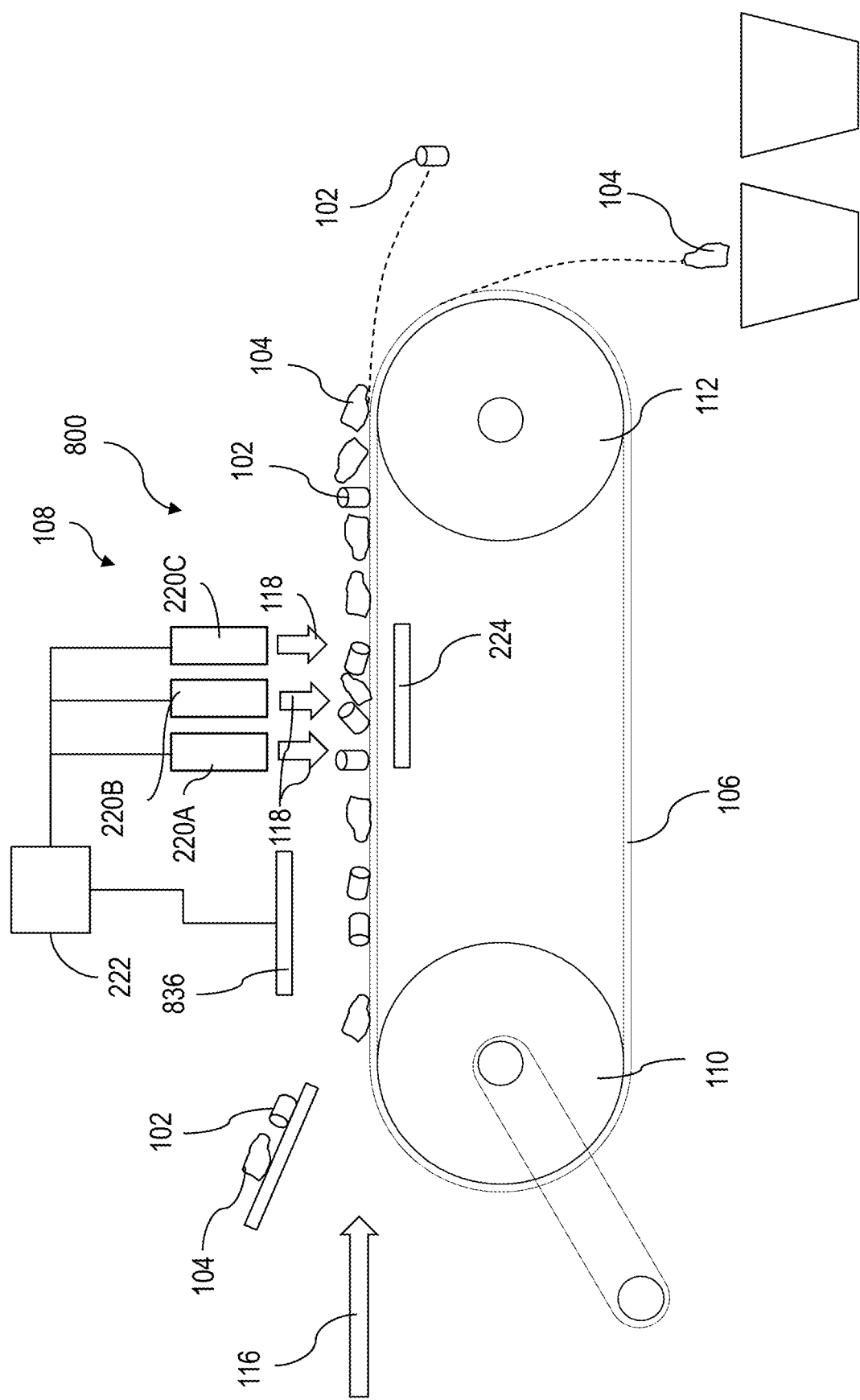
FIG. 8 is a side view of another conveying system according to aspects of the current disclosure.
Figure 9:
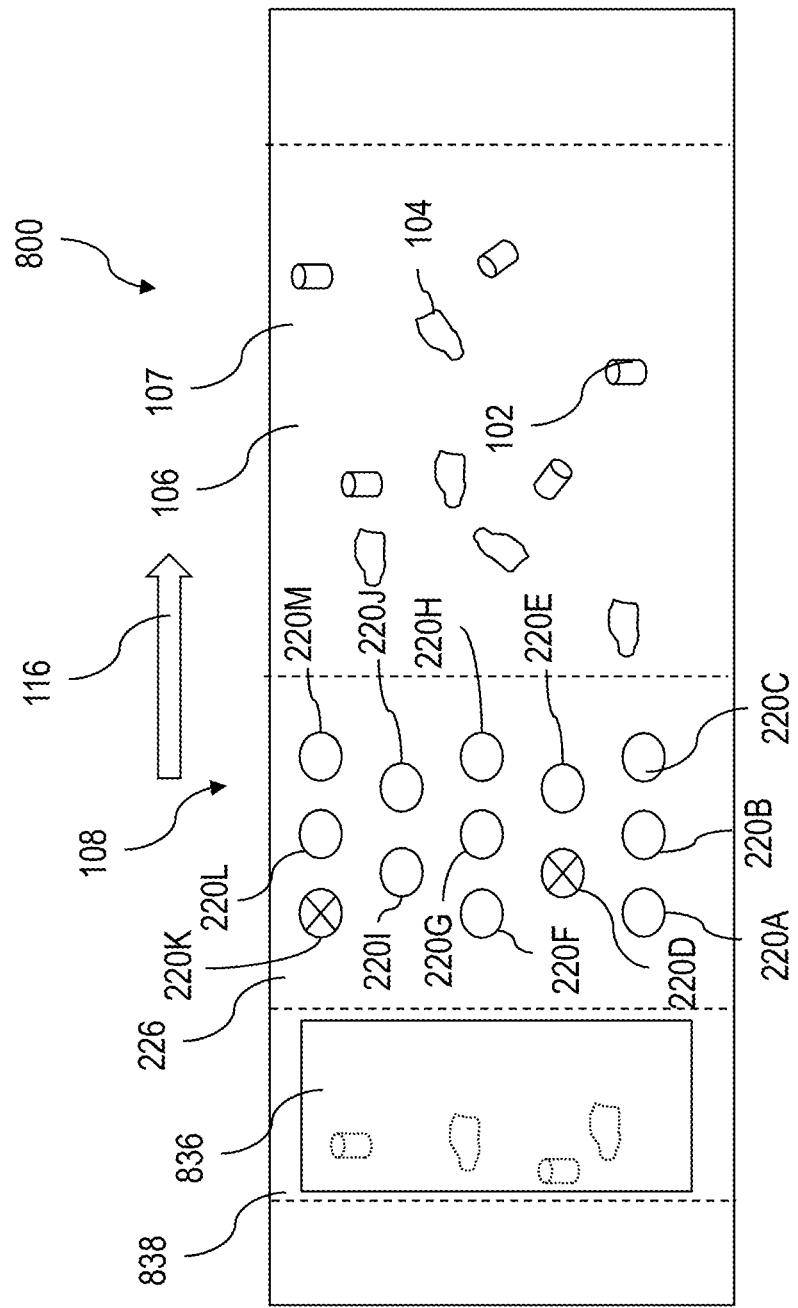
FIG. 9 is a top view of the conveying system of FIG. 8.

FIGS. 8 and 9 illustrate another example of a conveying system 800 that is substantially similar to the conveying system 200. Compared to the conveying system 200, the stabilizer 108 of the conveying system 800 further includes a sensor 836 for detecting the position of material (e.g., metal material 102) on the conveying surface 107. In some examples, the sensor 836 defines a sensing region 838 (see FIG. 9) that is upstream from the stabilizing region 226. In other examples, the sensing region 838 may partially or fully overlap the stabilizing region 226. In various examples, the controller 222 is configured to selectively activate and/or control one or more of the electromagnets 220 based on a position of the metal material 102 detected by the sensor 836. As one non-limiting example, in FIG. 9, based on a position of the metal material 102 as detected by the sensor 836, the controller 222 has activated electromagnets 220D and 220K (indicated by the "X") to apply the stabilizing forces 118. In certain examples, one or more of the electromagnets 220 (or the stabilizer 108 in general) may be in a deactivated state until the sensor 836 detects a targeted material, such as the metal material 102, on the conveyor belt 106. In such examples, the sensing region 838 may be a triggering region for the stabilizer 108.

FIG. 10 illustrates another example of a conveying system 1000 that is substantially similar to the conveying system 100 except that the stabilizer 108 is aligned with the ECS roller 112.

Figure 11:
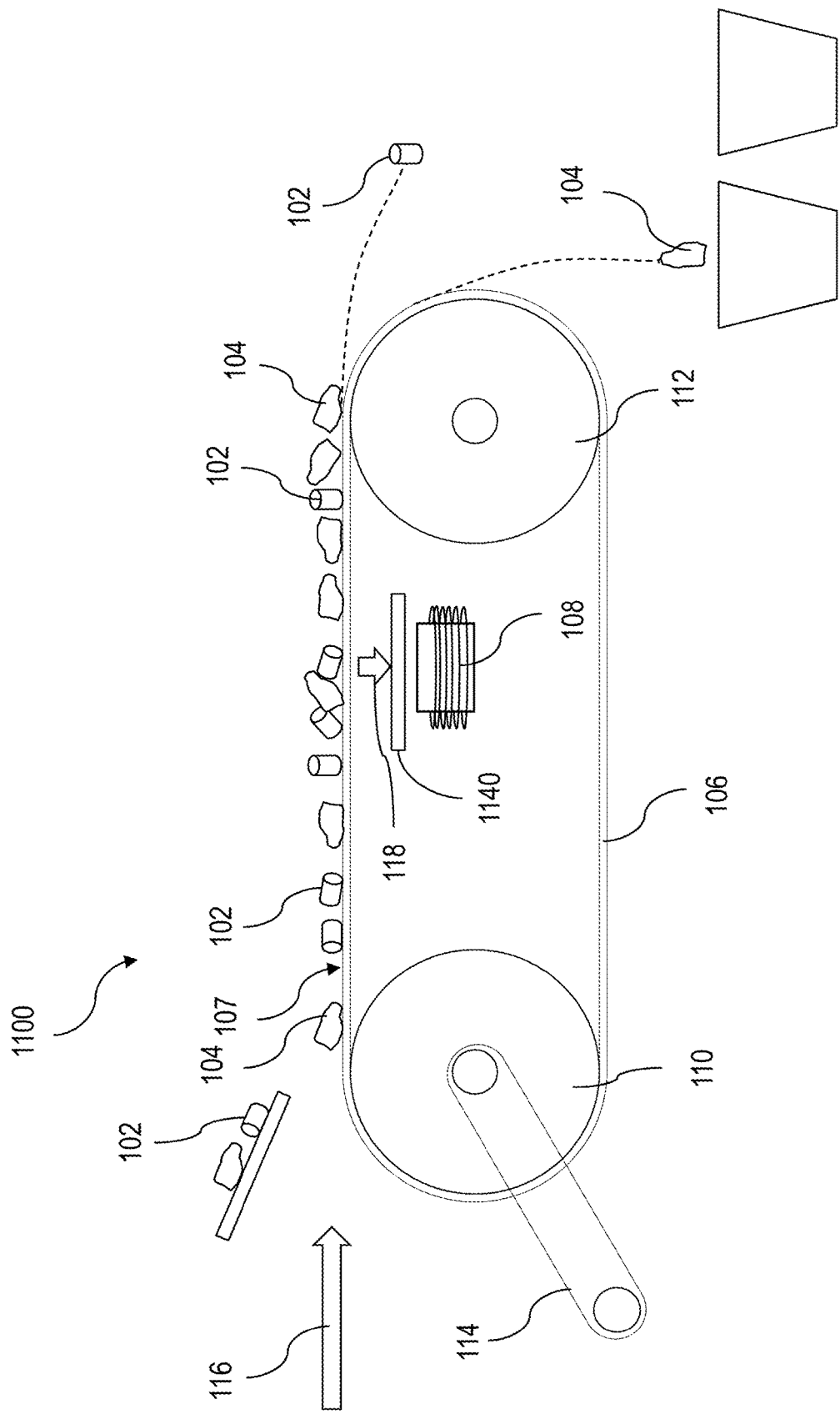
FIG. 11 is a side view of another conveying system according to aspects of the current disclosure.

FIG. 11 illustrates another example of a conveying system 1100 that is substantially similar to the conveying system 100 except that the stabilizer 108 includes the electromagnet 120 below the conveying surface 107, and a copper plate 1140 is provided between the electromagnet 120 and the conveying surface 107. In such examples, the magnetic field of the electromagnet 120 acts on both the copper plate 1140 and the material on the conveying surface 107. The magnetic field acting on the copper plate 1140 generates an attraction force as the stabilizing force 118 between the top of the copper plate 1140 and the metal material 102 on the conveying surface 107 such that the metal material 102 is stabilized.

Figure 12:
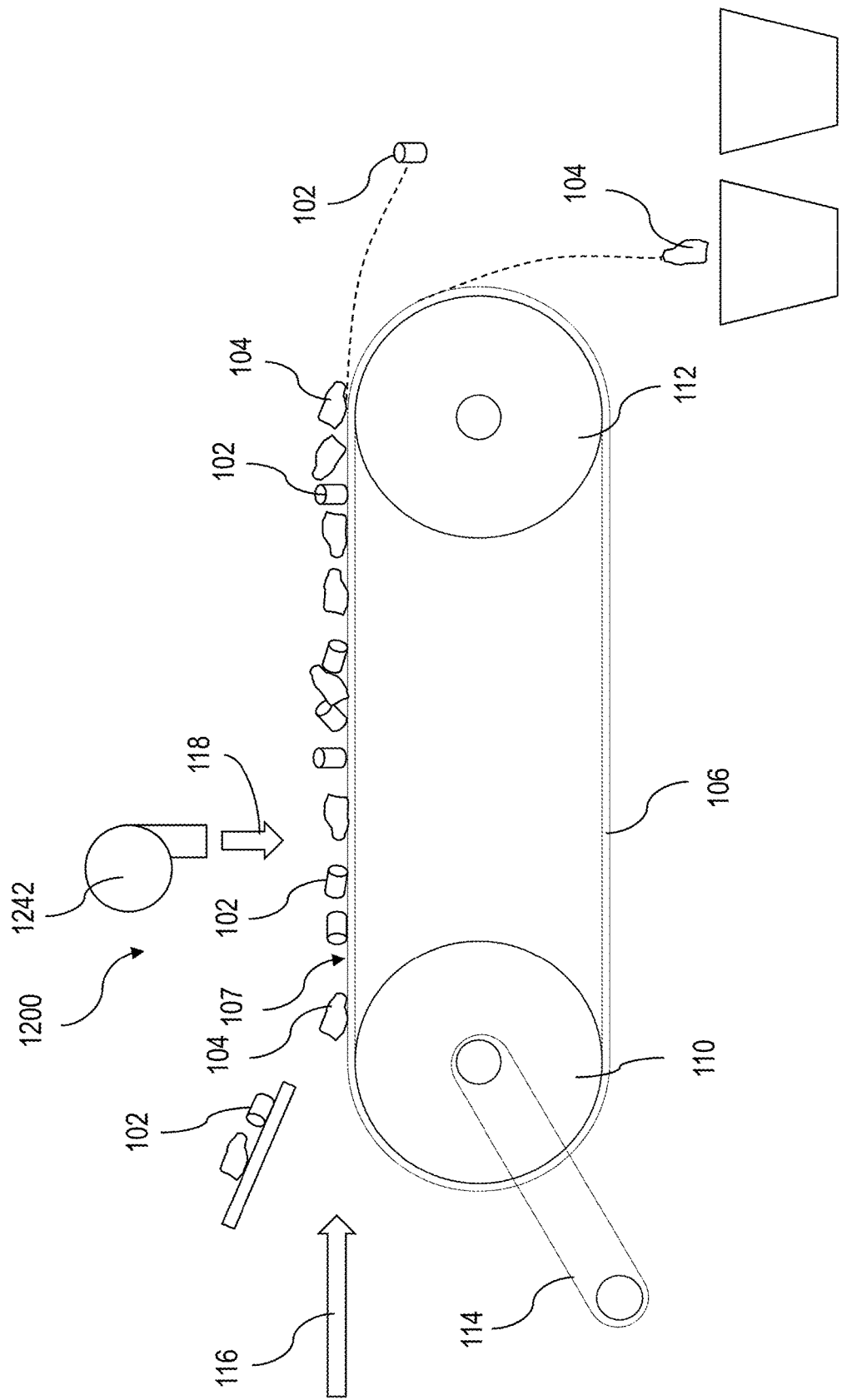
FIG. 12 is a side view of another conveying system according to aspects of the current disclosure.

FIG. 12 illustrates another example of a conveying system 1200 that is substantially similar to the conveying system 100 except that the stabilizer 108 includes an air generator 1242 that is configured to provide air flow at a predetermined rate, and the stabilizing force 118 is air flow.

Figure 13:
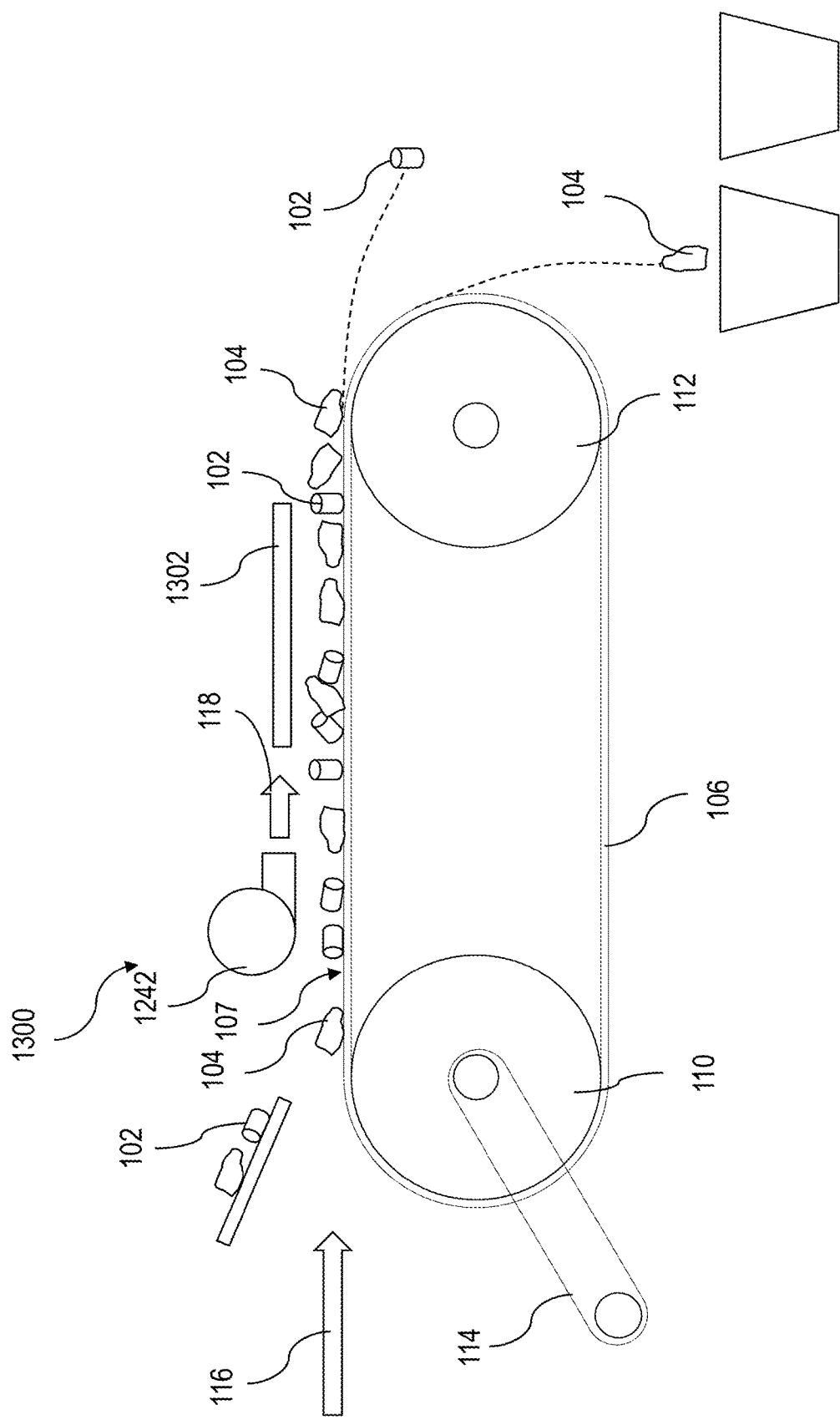
FIG. 13 is a side view of another conveying system according to aspects of the current disclosure.

FIG. 13 illustrates another example of a conveying system 1300 that is substantially similar to the conveying system 1200 except that the air generator 1242 forces air in the direction of belt travel with a velocity equal to the velocity of the belt. Optionally, a cover 1302 is provided, and the air generator 1242 forces air between the cover 1302 and the belt.

Figure 14:
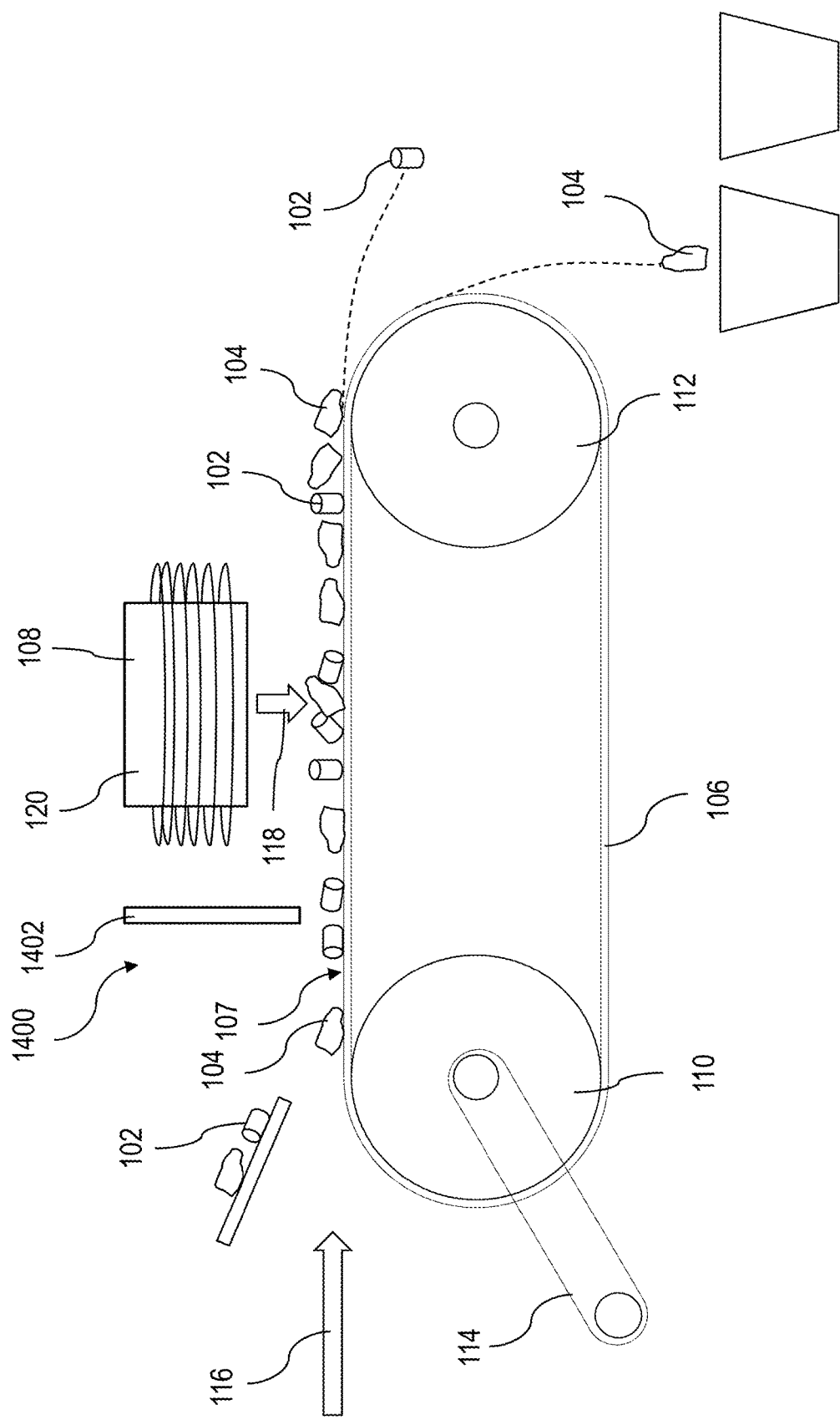
FIG. 14 is a side view of another conveying system according to aspects of the current disclosure.

FIG. 14 illustrates another example of a conveying system 1400 that is substantially similar to the conveying system 100 except that the conveying system 1400 further includes a curtain 1402 that helps to orient the material on the belt before the stabilizer 108. In certain examples, the curtain 1402 could be various devices for orienting the material on the belt before the stabilizer 108 including, but not limited to, individually hanging chains, strips of rubber, a sheet of rubber, and/or any other substance or device suitable for directing bouncing material back to the belt.

Methods of stabilizing material on the conveyor belt 106 of a conveying system are also disclosed. In some examples, the method includes receiving the material on a conveying surface of the conveyor belt and conveying the material at a conveying speed with the conveyor belt. The method includes applying the stabilizing force 118 onto the material with the stabilizer 108 such that vertical displacement of at least some of the material is dampened and/or minimized. In certain cases, a position of at least some of the material relative to the conveying surface is maintained at the conveying speed.

In certain examples, the stabilizer 108 is initially in a deactivated state, and the method includes activating the stabilizer 108 when the conveying speed is a high conveying speed. In other examples, the method includes activating the stabilizer 108 when the conveying speed is a low conveying speed or a high conveying speed.

In various examples, the method includes controlling the stabilizing force 118. In some examples where the stabilizer 108 is a magnet, the method includes controlling the stabilizing force 118 by controlling at least one of a strength of the magnetic field, a frequency of the magnetic field, or a direction of the magnetic field. In certain cases, the method includes detecting a position of a non-ferrous metal of the material on the conveying surface 107 before applying the stabilizing force 118. In various aspects, applying the stabilizing force 118 includes applying the stabilizing force 118 at the position of the non-ferrous metal on the conveying surface 107.

A collection of exemplary examples, including at least some explicitly enumerated as "ECs" (Example Combinations), providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

EC 1. A conveying system comprising: a conveyor belt comprising a conveying surface, the conveyor belt adapted to convey material on the conveying surface; and a stabilizer configured to apply a stabilizing force onto the material on the conveyor belt.

EC 2. The conveying system of any of the preceding or subsequent example combinations, further comprising a first roller and a second roller downstream from the first roller, wherein the conveyor belt is movably supported on the first roller and the second roller, and wherein the second roller is at an end of the conveying system.

EC 3. The conveying system of any of the preceding or subsequent example combinations, wherein the second roller comprises an eddy current separator roller configured to apply a magnetic field onto the material on the conveyor belt.

EC 4. The conveying system of any of the preceding or subsequent example combinations, wherein the stabilizer is provided adjacent to the second roller such that the stabilizing force is applied onto the material at the second roller.

EC 5. The conveying system of any of the preceding or subsequent example combinations, wherein the stabilizer is provided upstream from the second roller such that the stabilizing force is applied onto the material upstream from the second roller.

EC 6. The conveying system of any of the preceding or subsequent example combinations, wherein the first roller and the second roller are configured to move the conveyor belt at a conveying speed of from about 10 m/s to about 20 m/s, and wherein the stabilizer is configured to apply the stabilizing force onto the material on the conveyor belt such that the material is stabilized at the conveying speed.

EC 7. The conveying system of any of the preceding or subsequent example combinations, wherein the stabilizer is configured to apply the stabilizing force onto non-ferrous metals of the material.

EC 8. The conveying system of any of the preceding or subsequent example combinations, wherein the stabilizer comprises at least one magnet above the conveying surface, and wherein the at least one magnet is configured to apply a downward magnetic field as the stabilizing force onto the material.

EC 9. The conveying system of any of the preceding or subsequent example combinations, wherein the at least one magnet is a permanent magnet, and optionally wherein the permanent magnet is vertically adjustable relative to the belt or a rotational speed of the permanent magnet is adjustable to adjust the stabilizing force.

EC 10. The conveying system of any of the preceding or subsequent example combinations, further comprising a magnetic flux director below the conveying surface such that the conveying belt passes between the at least one magnet and the magnetic flux director.

EC 11. The conveying system of any of the preceding or subsequent example combinations, wherein the at least one magnet is an electromagnet.

EC 12. The conveying system of any of the preceding or subsequent example combinations, wherein the electromagnet is adjustable such that the downward magnetic field is adjustable.

EC 13. The conveying system of any of the preceding or subsequent example combinations, wherein at least one of a strength of the downward magnetic field, a frequency of the magnetic field, or an angle of a central axis of the electromagnet with respect to the conveying surface are adjustable.

EC 14. The conveying system of any of the preceding or subsequent example combinations, wherein the at least one magnet comprises a plurality of magnets.

EC 15. The conveying system of any of the preceding or subsequent example combinations, wherein the stabilizer further comprises a first region comprising a first subset of the plurality of magnets and a second region comprising a second subset of the plurality of magnets, and wherein the magnetic field generated by at least one of the magnets of the first subset is different from the magnetic field generated by at least one of the magnets of the second sub set.

EC 16. The conveying system of any of the preceding or subsequent example combinations, wherein the stabilizer further comprises a triggering region and a stabilizing region, wherein the at least one magnet is in the stabilizing region.

EC 17. The conveying system of any of the preceding or subsequent example combinations, wherein each magnet is independently controllable.

EC 18. The conveying system of any of the preceding or subsequent example combinations, further comprising: a sensor upstream from the stabilizer; and a controller, wherein the sensor is configured to detect a position of at least one non-ferrous piece of metal of the material on the conveying surface, and wherein the controller is configured to activate at least one of the plurality of magnets corresponding to the position on the conveying surface.

EC 19. The conveying system of any of the preceding or subsequent example combinations, wherein the stabilizer is configured to apply the stabilizing force in a stabilizing region, wherein the stabilizing force comprises an upstream stabilizing force at an upstream portion of the stabilizing region and a downstream stabilizing force at a downstream portion of the stabilizing region, and wherein the downstream stabilizing force is different from the upstream stabilizing force.

EC 20. The conveying system of any of the preceding or subsequent example combinations, wherein the downstream stabilizing force is greater than the upstream stabilizing force.

EC 21. The conveying system of any of the preceding or subsequent example combinations, further comprising a controller configured to control the stabilizer based on a conveying speed of the conveyor belt.

EC 22. The conveying system of any of the preceding or subsequent example combinations, further comprising a sensor configured to detect a position of at least one non-ferrous piece of metal of the material on the conveying surface, and wherein the controller is configured to control the stabilizer based on the position on the conveying surface.

EC 23. The conveying system of any of the preceding or subsequent example combinations, wherein the stabilizer comprises at least one air flow generator configured to provide air flow at a predetermined rate onto the conveying surface at a predetermined air flow level.

EC 24. The conveying system of any of the preceding or subsequent example combinations, wherein the stabilizer comprises: at least one electromagnet below the conveying surface of the conveyor belt; and a copper plate between the conveyor belt and the at least one electromagnet, wherein the at least one electromagnet is configured to apply a primary magnetic field on the copper plate such that an attraction force is created between a top of the copper plate and a non-ferrous piece of the material.

EC 25. The conveying system of any of the preceding or subsequent example combinations, wherein the stabilizer is configured to apply a stabilizing force onto a non-ferrous metal of the material on the conveyor belt, and wherein the non-ferrous metal is stabilized such that vertical displacement of at least some of the material is dampened and/or minimized while being conveyed.

EC 26. A method of stabilizing material on a conveyor belt comprising: receiving the material on a conveying surface of the conveyor belt; conveying the material at a conveying speed with the conveyor belt; and applying a stabilizing force onto the material with a stabilizer a stabilizer such that vertical displacement of at least some of the material is dampened and/or minimized at the conveying speed.

EC 27. The method of any of the preceding or subsequent example combinations, wherein the conveying speed is from about 1 m/s to about 20 m/s.

EC 28. The method of any of the preceding or subsequent example combinations, wherein the conveying speed is from about 10 m/s to about 20 m/s.

EC 29. The method of any of the preceding or subsequent example combinations, wherein at least some of the material comprises non-ferrous metal, and wherein the stabilizing force is applied on the non-ferrous metal.

EC 30. The method of any of the preceding or subsequent example combinations, wherein the stabilizer comprises at least one magnet, and wherein the stabilizing force comprises a magnetic field.

EC 31. The method of any of the preceding or subsequent example combinations, wherein the at least one magnet comprises an electromagnet.

EC 32. The method of any of the preceding or subsequent example combinations, further comprising controlling the magnetic field by controlling at least one of a strength of the magnetic field, a frequency of the magnetic field, or a direction of the magnetic field.

EC 33. The method of any of the preceding or subsequent example combinations, further comprising detecting a position of a non-ferrous metal of the material on the conveying surface before applying the stabilizing force.

EC 34. The method of any of the preceding or subsequent example combinations, wherein applying the stabilizing force comprises applying the stabilizing force at the position on the conveying surface.

EC 35. The method of any of the preceding or subsequent example combinations, wherein the stabilizer comprises a plurality of magnets, wherein a first subset of the plurality of magnets is arranged in a first region and a second subset of the plurality of magnets is arranged in a second region, wherein applying the stabilizing force comprises applying a first magnetic field by the first subset the plurality of magnets and applying a second magnetic field by the second subset of the plurality of magnets, and wherein the second magnetic field is different from the first magnetic field.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A conveying system comprising:
a conveyor belt comprising a conveying surface, the conveyor belt adapted to convey material on the conveying surface; and
a stabilizer configured to apply a stabilizing force onto the material on the conveyor belt, wherein the stabilizer comprises at least one magnet above the conveying surface, wherein the at least one magnet is configured to apply a downward magnetic field as the stabilizing force onto the material.

2. The conveying system of claim 1, further comprising a first roller and a second roller downstream from the first roller, wherein the conveyor belt is movably supported on the first roller and the second roller, and wherein the second roller is at an end of the conveying system.

3. The conveying system of claim 2, wherein the second roller comprises an eddy current separator roller configured to apply a magnetic field onto the material on the conveyor belt.

4. The conveying system of claim 2, wherein the stabilizer is provided adjacent to the second roller such that the stabilizing force is applied onto the material at the second roller.

5. The conveying system of claim 2, wherein the stabilizer is provided upstream from the second roller such that the stabilizing force is applied onto the material at a location upstream from the second roller.

6. The conveying system of claim 2, wherein the first roller and the second roller are configured to move the conveyor belt at a conveying speed of from about 10 m/s to about 20 m/s, and wherein the stabilizer is configured to apply the stabilizing force onto the material on the conveyor belt such that the material is stabilized at the conveying speed.

7. The conveying system of claim 1, wherein the at least one magnet is adjustable to adjust the stabilizing force.

8. The conveying system of claim 1, wherein the at least one magnet comprises a plurality of magnets, wherein the stabilizer further comprises a first region comprising a first subset of the plurality of magnets and a second region comprising a second subset of the plurality of magnets, and wherein the magnetic field generated by at least one of the magnets of the first subset is different from the magnetic field generated by at least one of the magnets of the second subset.

9. The conveying system of claim 1, wherein the at least one magnet comprises a plurality of magnets, wherein the stabilizer further comprises a triggering region and a stabilizing region, wherein the at least one magnet is in the stabilizing region.

10. The conveying system of claim 1, wherein the at least one magnet comprises a plurality of magnets, wherein each magnet is independently controllable, and wherein the conveying system further comprises:
a sensor upstream from the stabilizer; and
a controller,
wherein the sensor is configured to detect a position of at least one non-ferrous piece of metal of the material on the conveying surface, and
wherein the controller is configured to activate at least one of the plurality of magnets corresponding to the position on the conveying surface.

11. The conveying system of claim 1, wherein the stabilizer is configured to apply the stabilizing force in a stabilizing region, wherein the stabilizing force comprises an upstream stabilizing force at an upstream portion of the stabilizing region and a downstream stabilizing force at a downstream portion of the stabilizing region, and wherein the downstream stabilizing force is different from the upstream stabilizing force.

12. The conveying system of claim 1, further comprising:
a controller; and
a sensor configured to detect a position of at least one non-ferrous piece of metal of the material on the conveying surface,
wherein the controller is configured to control the stabilizer based on at least one of the position on the conveying surface or a conveying speed of the conveyor belt.

13. A method of stabilizing material on a conveyor belt comprising:
receiving the material on a conveying surface of the conveyor belt;
conveying the material at a conveying speed with the conveyor belt; and
applying a stabilizing force onto the material with a stabilizer such that vertical displacement of at least some of the material is dampened and/or minimized at the conveying speed,
wherein the method further comprises detecting a position of a non-ferrous metal of the material on the conveying surface before applying the stabilizing force, and wherein applying the stabilizing force comprises applying the stabilizing force at the position on the conveying surface.

14. The method of claim 13, wherein the conveying speed is from about 1 m/s to about 20 m/s.

15. The method of claim 13, wherein at least some of the material comprises non-ferrous metal, and wherein the stabilizing force is applied on the non-ferrous metal.

16. The method of claim 13, wherein the stabilizer comprises at least one magnet, and wherein the stabilizing force comprises a magnetic field.

17. The method of claim 16, further comprising controlling the magnetic field by controlling at least one of a strength of the magnetic field, a frequency of the magnetic field, or a direction of the magnetic field.

18. The method of claim 13, wherein the stabilizer comprises a plurality of magnets, wherein a first subset of the plurality of magnets is arranged in a first region and a second subset of the plurality of magnets is arranged in a second region, wherein applying the stabilizing force comprises applying a first magnetic field by the first subset of the plurality of magnets and applying a second magnetic field by the second subset of the plurality of magnets, and wherein the second magnetic field is different from the first magnetic field.

19. A conveying system comprising:
a conveyor belt comprising a conveying surface, the conveyor belt adapted to convey material on the conveying surface;
a stabilizer configured to apply a stabilizing force onto the material on the conveyor belt;
a controller; and
a sensor configured to detect a position of at least one non-ferrous piece of metal of the material on the conveying surface,
wherein the controller is configured to control the stabilizer based on at least one of the position on the conveying surface or a conveying speed of the conveyor belt.

* * * * *